United States Patent [19]

Horton

[11] Patent Number: 4,661,327

[45] Date of Patent: Apr. 28, 1987

[54] RECOVERY OF MINERAL VALUES USING MAGNETICALLY SUSCEPTIBLE ION EXCHANGE AGENT

[75] Inventor: Robert L. Horton, South Russell, Ohio

[73] Assignee: Phillips Petroleum Company, Bartlesville, Okla.

[21] Appl. No.: 480,202

[22] Filed: Mar. 30, 1983

[51] Int. Cl.$^4$ .................. C22B 60/02; C22B 9/00
[52] U.S. Cl. ........................ 423/7; 423/658.5; 423/DIG. 14; 75/101 BE; 210/661; 210/679; 210/681; 210/682; 210/695
[58] Field of Search .............. 75/101 BE; 210/679, 210/682, 661, 681, 695; 423/DIG. 14, 7, 658.5

[56] References Cited

U.S. PATENT DOCUMENTS

| | | | |
|---|---|---|---|
| 2,642,514 | 6/1953 | Herkenhoff | 210/679 X |
| 3,560,378 | 2/1971 | Weiss et al. | 75/101 BE X |
| 3,607,740 | 9/1971 | Akeroyd | 210/676 |
| 3,657,119 | 4/1972 | Turbeville | 210/680 |
| 3,890,224 | 6/1975 | Weiss et al. | 210/671 |
| 3,977,984 | 8/1976 | Roberts | 252/62.54 |
| 4,083,957 | 4/1978 | Lang | 424/78 |
| 4,115,927 | 9/1978 | Rosensweig | 34/1 |
| 4,134,831 | 1/1979 | Dawson et al. | 423/7 X |
| 4,201,831 | 5/1980 | Slusarczuk et al. | 210/679 X |
| 4,211,664 | 7/1980 | Dixon et al. | 252/184 X |
| 4,284,511 | 8/1981 | Weitzen et al. | 210/679 X |
| 4,311,340 | 1/1982 | Lyons et al. | 299/4 |
| 4,314,905 | 2/1982 | Etzel et al. | 210/670 |
| 4,339,337 | 7/1982 | Tricot et al. | 252/62.54 |
| 4,368,131 | 1/1983 | Rosenweig | 428/403 X |

FOREIGN PATENT DOCUMENTS 1337066 11/1973 United Kingdom ............... 210/679

OTHER PUBLICATIONS

Svyadoshich et al., Abstract of USSR Pat. No. 497,027, Apr. 5, 1976, in 10 *Soviet Inventions Illustrations* 2 (#41), Nov. 1976.
Merritt, Robert C., *The Extractive Metallurgy of Uranium*, Colorado School of Mines Research Institute, (1971), pp. 138, 176–179.

*Primary Examiner*—John F. Terapane
*Assistant Examiner*—Matthew A. Thexton
*Attorney, Agent, or Firm*—C. F. Steininger

[57] ABSTRACT

A novel ion exchange agent comprises a magnetically susceptible core or nucleus surrounded by a coating of plastic or resin ion exchange material, preferably a microreticular coating immediately surrounding the magnetically susceptible core and a macroreticular coating surrounding the microreticular coating and a novel method of preparing the same. A novel ion exchange process is disclosed, including applying a magnetic field to the body of the magnetically susceptible ion exchange agent to at least temporarily immobilize the ion exchange agent while passing liquids therethrough, particularly in the washing or other treatment of ground ores to recover mineral values therefrom in a resin-in-pulp process. Another aspect of the present invention relates to a novel method of recovering mineral values from ores, particularly uranium-containing ores wherein the ground ore is simultaneously contacted with a leach solution adapted to remove mineral values from the ore and a liquid or solid ion exchange agent adapted to remove the mineral values from the leach solution by ion exchange.

13 Claims, 4 Drawing Figures

RECOVERY OF MINERAL VALUES USING MAGNETICALLY SUSCEPTIBLE ION EXCHANGE AGENT

BACKGROUND OF THE INVENTION

The present invention relates to novel ion exchange agents and the manufacture and use thereof. In another aspect, the present invention relates to a novel method of contacting solid ion exchange agents with liquids. Yet another aspect of the present invention relates to the recovery of mineral values from mineral-containing deposits. A still further aspect of the present invention relates to an improved method of leaching and recovering mineral values from mineral-containing ores.

Ion exchange materials, their manufacture and their use are well known in the prior art.

It is also well known that there are two types of ion exchange materials, which depend upon their physical form, namely, solid or liquid. The solid ion exchange materials are semi-rigid gels prepared as spherical beads. These materials are generally referred to in the art as ion exchange resins and the use thereof to remove ions from the solutions is often referred to as adsorption. By contrast, liquid ion exchange materials are often referred to in the art as solvents and the use thereof to remove ions from a solution is referred to as solvent extraction. Obviously, references to liquid ion exchange materials as solvents and their uses as solvent extraction is misleading to the extent that this terminology is too broad and it is not technically accurate. Consequently, the terminology "solvents" and "solvent extraction" will be avoided in the present specification and both solid and liquid ion exchange materials will be referred to herein as "ion exchange agents" or "ionic agents" and the use of both solid and liquid ion exchange agents will be referred to as "ion exchange".

There are also two types of ion exchange agents, which depend upon the chemical characteristics thereof. Either solid or liquid ion exchange agents may exist in the form of anionic agents or cationic agents. Accordingly, ion exchange agents are selected on the basis of the type of ion to be extracted from the solution to be treated.

The preparation of liquid ionic exchange agents is of course a straightforward formation of the appropriate compounds. On the other hand, the preparation of solid ion exchange agents requires specific techniques in order to produce a material suitable for use as an ion exchange agent. Generally, solid ion exchange agents are, for example, polymers of monomeric material, such as styrene, and copolymers of materials, such as styrene and divinylbenzene. In either case, the liquid monomers are charged to a reactor containing water as a continuous phase. The monomers are water-insoluble so that agitation suspends the monomers as droplets in the water phase. The reactor is heated to a temperature sufficient to cause the monomers to polymerize or copolymerize, as the case may be, thus forming solid thermoset plastic spheres. This technique for the formation of solid ionic exchange agents is generally referred to in the art as "suspension polymerization". While water is specifically referred to as the continuous phase above, other suspending media which are immiscible with the monomer or in which the monomer is essentially insoluble may also be utilized. This basic technique of suspension polymerization results in the formation of gellular particles or beads wherein the pore structure is defined by molecular-sized openings between polymer chains. This type of molecular porosity is generally referred to in the art as "microporosity or microreticularity". There are also known techniques of "macroreticular" resins, which by contrast, contain significant non-gel porosity in addition to the normal gel porosity. The non-gel pores are channels between agglomerates of minute spherical gel particles. The microreticular resins make a continuous polymeric phase, while the macroreticular resins or agglomerates are randomly packed microspheres with a continuous non-gel porous structure. The macroreticular resins may be prepared for example, by adding to the suspension previously described a suitable "polymer precipitant". Such precipitants are solvents for the monomer or monomer mixture being polymerized, but exert essentially no solvent action on the resultant polymer or copolymer nor are they imbibed in the copolymer or polymer to any appreciable extent. These precipitants are in general, alkanols having about 4 to 10 of carbon atoms per molecule, such as tertiary amyl alcohol, secondary butanol, etc. Details of the conventional techniques for the formation of microreticular ion exchange agents and, more specifically, the formation of macroreticular ion exchange agents are set forth in, for example, U.S. Pat. No. 4,224,415, which is incorporated herein by reference.

For ion exchange purposes in general, it is important that a major portion of the particles or beads, for example 80% or more by weight, be in the form of granules of 10 to 60 and preferably 20 to 40 mesh size. (Here and in the discussion below, mesh sizes referred to are Tyler Standard Screen Scale Sieve mesh sizes, well-known to those skilled in the art of ore leaching and ion exchange agent manufacture and use.) Smaller particles tend to be washed away during conditioning and use, whereas larger particles tend to develop excessive internal strains and to undergo shattering and spalling with the formation of fine particles, both during preconditioning and use.

Conversion of the solid plastic particles or beads to an ion exchange material is also well known in the art. For example, cation exchange materials may be produced by sulfonation of the beads with concentrated sulfuric acid, oleum, sulfur trioxide or chlorosulfonic acid. Anion exchange agents may be prepared by chloralkylating and subsequently aminating the polymers. For example, the polymer may be treated with chloromethylether and thereafter with either dimethylamine (producing a weak base ion exchange agent) or trimethylamine (producing a strong base ion exchange agent).

There are also a number of known uses for both liquid and solid ion exchange agents, such as the removal of ions from sea waters, drinking waters, etc., run off water from mines and mine tailings and the extraction of minerals from leachants or lixiviants utilized for the extraction of metals from subsurface formations and ores. Certain specific embodiments of the present invention are direction to the removal of minerals from subsurface formations and ores and accordingly a more detailed description of the same will be set forth hereinafter.

Removal of ions from an ion-containing solution, whether with liquid or solid ion exchange agents is basically a matter of contacting the solution with the ion exchange agent and thereafter separating the ion exchange agent from the deionized solution. In the case of liquid ion exchange resins, contacting may be batch, semi-continuous, continuous or continuous countercurrent. In addition to the ability to carry out a countercurrent contacting, liquid ion exchange agents have a number of advantages, including high efficiency, low capital cost, adaptability to automatic control and the availability of nearly "off the shelf" equipment. However, disadvantages include the necessity of nearly solids-free ion-containing solutions, the formation of emulsions, the loss of solvent to the deionized solution and, in some cases, extra safety precautions in the handling of flammable fluids. In the use of solid ion exchange agents, contacting is carried out either in a batch or semi-continuous type of process, while continuous countercurrent operation is most difficult. In any event, plants for the use of solid ion exchange materials are relatively complex and require specialized equipment. While solid ion exchange materials can tolerate solids in the ion containing material, in such cases the particle size of the ion exchange material must be carefully controlled for the reasons previously set forth and there is a tendency to plug the ion exchange material.

Since ion exchange agents are organic in nature, separation of the ion exchange agent from the deionized solution can be carried out by gravity separation in the case of either liquid or solid ion exchange agents and of filtering in the case of solid ion exchange agents. In any event, loss of ion exchange agent and adequate separation are serious problems.

Removal of the exchanged ions from the ion exchange agent is generically a matter of reversing the ion exchange. The removal of exchanged ions from a liquid ion exchange agent is generally referred to in the art as "stripping" and the agent utilized for this purpose is generally referred to as a "stripping agent". Stripping agents in general include nitrates, chlorides, sulfates, carbonates, hydroxides and dilute acids. In the case of solid ion exchange agents, removal of the exchanged ions is commonly referred to in the art as "elution" and the agent utilized is referred to as the "eluant". At times the term "regeneration" is also used. However, the latter terminology will be utilized herein only for the treatment of the ion exchange agent to remove "poisons" or other extraneous ions not removed in the normal process of elution so as to restore the ion exchange agent to near its original capacity. Typical elution agents include dilute nitrate or chloride solutions, as well as sulfuric acid solutions. If solids are contained in the ion-containing solution, it is usually necessary to subject the ion exchange agent to a preliminary water wash to remove the solid materials prior to elution. In both cases, there are the obvious problems of loss of ion exchange agent when any solution is passed through the ion exchange agent and particularly where other solids are also present.

As previously indicated, certain embodiments of the present invention are directed to the recovery of minerals from subsurface earth formations and ores by means of leachants or lixiviants and the solid ion exchange agents of the present invention are particularly useful in such operations.

Numerous minerals are present in subsurface earth formations in very small quantities which make their recovery extremely difficult. However, in most instances, these minerals are also extremely valuable, thereby justifying efforts to recover the same. An example of one such mineral is uranium. However, numerous other valuable minerals, such as copper, nickel, molybdenum, rhenium, silver, selenium, vanadium, thorium, gold, rare earth metals, etc., are also present in small quantities in some subsurface formations, alone and quite often associated with uranium. Consequently, the recovery of such minerals is fraught with essentially the same problems as the recovery of uranium and, in general, the same techniques for recovering uranium can also be utilized to recover such other mineral values, whether associated with uranium or occurring alone. Therefore, a discussion of the recovery of uranium will be appropriate for all such minerals.

Uranium occurs in a wide variety of subterranean strata such as granites and granitic deposits, pegmatites and pegmatite dikes and veins, and sedimentary strata such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered.

There are several known techniques for extracting uranium values from uranium-containing materials. One common technique is roasting of the ore, usually in the presence of a combustion supporting gas, such as air or oxygen, and recovering the uranium from the resultant ash. However, the present invention is directed to the extraction of uranium values by the utilization of aqueous leaching solutions. There are two common leaching techniques for recovering uranium values, which depend primarily upon the accessibility and size of the subterranean deposit. To the extent that the deposit containing the uranium is accessible by conventional mining means and is of sufficient size to economically justify conventional mining, the ore is mined, ground to increase the contact area between the uranium values in the ore and the leach solution, usually less than about 14 mesh but in some cases, such as limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a "pregnant" solution, is produced through at least one production well penetrating the deposit. In certain embodiments, the present invention is directed to both in-situ leaching and the leaching of mined ores.

The most common aqueous leach solutions are either aqueous acidic solutions, such as sulfuric acid solutions, or aqueous alkaline solutions, such as sodium carbonate and/or bicarbonate.

Aqueous acidic solutions are normally quite effective in the extraction of uranium values. However, aqueous acidic solutions generally cannot be utilized to extract uranium values from ore or in situ from deposits containing high concentrations of acid-consuming gangue, such as limestone. Aqueous alkaline leach solutions are applicable to many types of uranium-containing materials and for some ores are less expensive than acids.

As described to this point, the extraction of uranium values is dependent to some extent upon the economics of mining versus in-situ extraction and the relative costs of acidic leach solutions versus alkaline leach solutions. However, this is an oversimplification, to the extent that only uranium in its hexavalent state can be extracted in either acidic or alkaline leach solutions. While some uranium in its hexavalent state is present in ores and subterranean deposits, the vast majority of the uranium is present in its valence states lower than the hexavalent state. For example, uranium minerals are generally present in the form of uraninite, a natural oxide of uranium in a variety of forms such as $UO_2$, $UO_3$, $UO.U_2O_3$ and mixed $U_3O_8$ ($UO_2.2UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2.3H_2O$, and uranites which are mineral phosphates of uranium with copper or calcium, for example, uranite lime having the general formula $CaO.2UO_3.P_2O_5.8H_2O$. Consequently, in order to extract uranium values from ores with aqueous acidic or aqueous alkaline leach solutions, it is necessary to oxidize the lower valence states of uranium to the soluble, hexavalent state.

Combinations of acids and oxidants which have been suggested by the prior art include nitric acid, hydrochloric acid or sulfuric acid, particularly sulfuric acid, in combination with air, oxygen, sodium chlorate, potassium permanganate, hydrogen peroxide and magnesium perchlorate and dioxide, as oxidants. Alkaline leachants and oxidants heretofore suggested include carbonates and/or bicarbonates of ammonium, sodium or potassium in combination with air, oxygen or hydrogen peroxide, as lixivants.

Numerous problems obviously arise in the leaching of uranium values from uranium-containing ores. One of the most obvious is, of course, the large quantities of ores being handled and treated compared with the amount of uranium recovered. Such large quantities of ores make it costly to crush and grind the same to a size which can be effectively leached in a relatively short period of time. For example, as previously pointed out, leached ore should be reduced in size to less than about 14 mesh, but an even smaller size, in the neighborhood of 100 to 400 mesh, or smaller, would be ideal. The cost of the latter, however, becomes prohibitive. It is, therefore, desirable to reduce the degree of grinding necessary. In addition, it would be highly desirable to reduce the quantities of ores handled in any given step of the process.

The large quantities of ores being treated also increase the amounts of leachant or lixivants and oxidants required in order to recover a given amount of uranium and/or attain such recovery in a reasonable time. Thus, it is also highly desirable to reduce the amounts of leachant or lixivant and oxidant to a minimum for effective results.

While the leaching operation can be carried out at temperatures from atmospheric temperature up to about the boiling point of water, it is known that for most ores the higher the temperature, the more effective and more rapid the leaching. Consequently, the usual range of temperatures is between about 80° and about 100° C. While this temperature range appears modest for most chemical operations, in the leaching of uranium-containing ore, the temperature becomes a very significant problem. This is true since, at the high temperatures employed, the cost of materials of construction of the leaching tanks is a major factor. For example, it is necessary to use rubber-lined stainless steel tanks and the manufacturers of such tanks will not assure reasonable lifetimes for the linings. Consequently, the utilization of less expensive equipment is desirable and even a small reduction in the temperature of the leaching operation can substantially reduce equipment costs and lengthen equipment life.

While it is relatively easy to recover 50% to 60% of the uranium content of an ore, at relatively low temperatures, with relatively low concentrations of leach solution and in relatively short periods of time, such recoveries are not acceptable except for certain very low cost in-situ operations. For an economic operation, especially when all the cost and effort have been expended to mine an ore, recoveries in excess of about 85% of the original uranium are required and usually above 90%. This, again, contributes substantially to the cost of leach solutions. Also, as in any other operation of this type, it is relatively easy to approach the desired and economic recoveries, but is most difficult to attain recovery of those last small increments which are necessary or desirable for an effective and economic oepation. Such limitations in the leaching operation are often caused by the fact that the leaching is a reversible reaction which results in an equilibrium relationship resulting between the uranium in the ore, the chemicals used to extract the uranium and the extracted uranium. Hence, regardless of the manner of contacting, etc., there is a maximum amount of uranium which can be leached without increasing the concentration of leach chemicals. In some ores there appears to be phenomena at work like organic-matter encapsulation of the mineral values. In these ores the rate of leaching is limited by diffusion of the leach chemicals into the mineral and of products of leaching back out into the bulk leach solution. Here, again, there is greater extraction in a given period of time with greater leach chemical concentration. Additionally, in both types of situations, leaching would be enhanced by reduced somehow the concentration of leaching products in the bulk solution. Such reduction is probably an important reason for the success of the methods in accordance with the present invention.

Mined uranium ores are generally crushed and then ground, for example, by the use of ball mills or rod mills. Conventionally, the ore is ground to a maximum particle size less than about 14 mesh and in some cases, less than about 300 mesh, depending upon the nature of the ore. In some cases, the ore is separated into a coarse fraction and a fines fraction. For example by screening to produce a fines fraction, of which a majority will pass through a 200 mesh screen or smaller. In some cases screening can be done to produce a fines fraction, which passes a screen in the neighborhood of 400 mesh while in other instances, the majority of the fines pass a screen in the neighborhood of about 300 mesh. However, a preferred technique for separation involves wet classification which is known to those skilled in the art of minerals recovery. In wet classification, the solids which float in the solution are separated and constituteed in the art of minerals recovery. In wet classification, the solids whihc float in the solution are separated and constituteed in the art of minerals recovery. In wet classification, the solids whihc float in the solution are separated and constitute the fines fraction, often referred to in the art as "slime" and the larger solids which settle out are referred to as the coarse fraction or "sand". By way of example, in wet classification of a particular ore, the resultant fines fraction comprised about 91% passing a 400 mesh screen in one case and about 87% passing a 325 mesh screen in another case. Such separation is usually carried out for the reason that the coarse fraction contains a smaller percentage of the original uranium than the fines fraction and it is substantially easier to leach than the fines fraction, thus different techniques for leaching can be utilized and certain economies and simplifications carried out. However, there are usually difficulties in leaching the fines fraction in spite of the fact that in the fines, the mineral values are probably better liberated from the gangue. The extra difficulty in leaching the fines is often attributable to increased leach chemical consumption by sorption onto and reaction with the fine gangue minerals.

While there are numerous techniques for recovering leached uranium or other minerals from the leach solution or lixiviant solution, one of the most widely utilized techniques is by the use of either liquid or solid ion exchange agents. The previously discussed techniques for ion exchange separation of the ion exchange agent from the deionized solution and the recovery of the exchanged ions from the ion exchange material are the same for minerals recovery as those previously discussed with relation to the utilization of ion exchange agents generally. Obviously, the same problems exist with respect to the presence of solids in a solution to be deionized, as was previously discussed, since these problems arise when either unclassified ore containing such fines, or a fines fraction alone are treated. This is particularly true since the fines or slime fraction is most difficult to remove from the leach solution. In order to overcome this problem and leach and recover uranium from a fines or slime fraction, a technique has been utilized in which the ore is first leached with a conventional leachant or lixiviant and is thereafter separated to remove the coarse fraction or sand from the fines or slime. The separated solution of fines in the leach solution is referred to as "pulp". The pulp is then contacted with a solid ion exchange agent to adsorb the uranium from the leach solution. This is a batch-type process in which a plurality of tanks are connected in series. Each tank is equipped with a plurality of baskets filled with the ion exchange agent. The baskets rise and fall in the pulp allowing it to seep through and contact the ion exchange agent which adsorbs the uranium anions. The vigorous movement of the baskets disperses the ion exchange agent in the basket and prevents the same from being caoted with slimes while the pulp freely circulates through the baskets surrendering its uranium content to the ion exchange agent. After passing through the various tanks, the barren pulp is water washed and set to a tailings pond. When the ion exchange agent becomes loaded with uranium, the tank in question is switched to an elution cycle and an eluant, such as sulfuric acid and sodium chloride is passed through the ion exchange agent to displace the uranum ions from the ion exchange agent. The uranium is then precipitated from the pregnant eluant solution. Processes of this sort are referred to as "resin-in-pulp leaching" by those skilled in the art.

Such an operation, while having some advantages also has a number of disadvantages, among which are the fact that it is a batch-type process, the ion exchange agent must be of controlled size and uniformity, attrition of the ion exchange agent is promoted and, thus, loss of the ion exchange agent and serious difficulties are encountered in maintaining separation of the ion exchange agent and the slime or fines.

SUMMARY OF THE INVENTION

It is, therefore, an object of the present invention to provide an improved solid ion exchange agent, a method of manufacturing the same and a technique for utilizing the same which overcomes the above and other problems of the prior art. Another object of the present invention is to provide an improved method of recovering mineral values from mineral-containing subsurface formations and mineral-containing ores, which overcome the above problems and disadvantages of the prior art. A further object of the present invention is to provide an improved method of recovering mineral values from mineral-containing subsurface formations and mineral-containing ores which reduces the amounts of leach chemicals required. Yet another object of the present invention is to provide an improved method for recovering mineral values from mineral-containing subsurface formations and mineral-containing ores which increases the percentage of mineral recovery. Another and further object of the present invention is to provide an improved method for recovering mineral values from mineral-containing subsurface formations and mineral-containing ores which permits the recovery of mineral values in a shorter period of time. A further object of the present invention is to provide an improved method for recovering mineral values from mineral-containing ores which can be carried out at a lower inventory of ore solids in extraction solutions. Another object of the present invention is to provide an improved method of recovering mineral values from mineral-containing ores wherein the volume of mineral-containing ores to be treated is reduced, the concentration of treating solutions is reduced and the percent recovery of mineral values is increased and/or the removal can be carried out in a shorter period of time. Still another object of the present invention is to provide an improved method for recovering mineral values from a leach solution containing the same. A further object of the present invention is to provide an improved method for recovering mineral values from a leach solution containing the same by means of ion exchange. Yet another object of the present invention is to provide an improved method of recovering mineral values from a leach solution containing the same utilizing the above-mentioned novel solid ion exchange agent. Another and further object of the present invention is to provide an improved method of ion exchange utilizing the above-mentioned novel solid ion exchange agent. Another object of the present invention is to provide an ion exchange method having improved kinetics through utilizing smaller particles of solid ion exchange agent than conventional techniques. A still further object of the present invention is to provide an improved method of ion exchange which facilitates the passage of liquids through a solid ion exchange agent. Another and further object of the present invention is to provide an improved ion exchange method which facilitates the removal of solid particles from mixture of a solid ion exchange agent and said particles. These and other objects and advantages of the present invention will be apparent from the following description.

In accordance with the present invention a novel solid ion exchange agent is provided, including a magnetically susceptible core or nucleus surrounded by a coating or mantle of plastic or resin ion exchange material. The novel magnetic ion exchange agent is prepared by suspending a monomer or plurality of monomers in an immiscible fluid, such as water, dispersing particles of a magnetically susceptible material in the suspension and subjecting the mixture to conditions sufficient to polymerize the monomers and thereby form a coating or mantle of polymeric material about the magnetically susceptible particles. In such process of manufacture, polymeric materials which do not have a magnetic core or nucleus can be readily separated from magnetic materials by applying a magnetic field to a body of the resultant polymeric particles. An ion exchange method utilizing the magnetic ion exchange material comprises passing a liquid through a body of the magnetic ion exchange material while simultaneously applying a magnetic field to the body of ion exchange agent. In another embodiment of the present invention, mineral values are extracted from mineral-containing subsurface earth formations or mineral-containing ores by contacting the mineral-containing material with a leach solution adapted to remove mineral values from the mineral-containing material while simultaneously contacting the mixture with a liquid or solid ion exchange agent. When an ore is treated in this manner, the ore is preferably separated into a coarse and a fines fraction and only the fines fraction is simulaneously contacted with the leach solution and the ion exchange agent. In yet another embodiment of the present invention, mineral values are removed from a leach solution containing such mineral values by contacting the leach solution with a body of the above-mentioned magnetic ion exchange material while simultaneously applying a magnetic field to the body of magnetic ion exchange agent. In yet another embodiment of the present invention, the above-mentioned magnetic ion exchange material containing exchanged ions of minerals is treated with a flowing liquid to remove the mineral ions from the ion exchange agent, wash the ion exchange agent to remove contaminants, including particle-form solids while simultaneously applying a magnetic field to the body of magnetic ion exchange agent.

DESCRIPTION OF THE PREFERRED EMBODIMENTS

As pointed out in the introductory portion hereof, numerous problems are encountered in the use of conventional solid ion exchange agents, to the extent that relatively large, uniform size, solid ion exchange agents must by utilized in order to maintain separation between the ion exchange agent and liquids which are flowed therethrough or permit separation of the ionic exchange agent from liquids which are mixed therewith or flowed therethrough and to prevent loss of solid ion exchange agents due to attrition and washing away of the ion exchange agent when separating the ion exchange agent from liquids with which they are mixed or which are flowed therethrough.

In accordance with the present invention, a novel solid ion exchange agent is provided which comprises a core or nucleus of a magnetically susceptible material surrounded by a coating or mantle of a thermoplastic material containing exchangeable ions.

The core or nucleus of the magnetic ion exchange agent comprises small particles of pieces of a magnetically susceptible material, preferably spherical in shape, and preferably of a size between about $-100$ and $+14$ mesh. Examples of such materials includes iron metal, certain stainless steels, ferrites, etc.

The polymeric coating or mantle surrounding the magnetically susceptible core or nucleus is a permeable polymer or copolymer conventionally utilized as solid ion exchange agents and having a microreticular or macroreticular structure, preferably the latter. A preferred material is a copolymer of styrene-divinylbenzene. The exchangeable ions included in the polymeric coating or mantle include any of the conventional exchangeable ion materials of either anionic or cationic character, for example, quaternary ammonium functional groups as the active anionic constituent or a sulfonate functional group as an active cationic constituent.

As is also previously pointed out in the introductory portion hereof, thermoplastic beads are conventionally prepared by suspension polymerization, wherein the monomer or monomers are dispersed in an immiscible liquid, particularly water, the mixture is agitated to suspend oil-like droplets of monomers or monomer mixture in the water which is present as the continuous phase in the reactor, and the reactor is heated to a temperature and under conditions sufficient to polymerize or copolymerize the monomer or monomers into a solid thermoset plastic sphere. This technique produces a gellular or microreticular polymer structure. Macroreticular beads are formed by the same suspension polymerization technique, except that there is added to the polymerization reactor a precipitant which is a solvent for the monomer or monomers but is not a solvent for the polymers and will not swell the same. Such precipitants are preferably alkanols with a carbon atom content of from 4 to about 10, such as tertiary amyl alcohol, secondary butanol, normal butanol, etc.

Suitable monomeric materials and techniques for suspension polymerization to form polymer beads are set forth in U.S. Pat. No. 4,224,415, among other literature references. This same patent is particularly directed to the preparation of macroreticular polymer beads and the conversion thereof to cationic exchange materials. Accordingly, this patent is incorporated herein by reference and the disclosures thereof together with materials and techniques known to those skilled in the art make it unnecessary to further detail materials and techniques for forming microreticular or macroreticular polymer beads for ion exchange purposes and the conversion thereof to solid ion exchange agents.

The novel method of preparing the magnetically susceptible solid ionic exchange agent in accordance with the present invention comprises conventionally suspending liquid monomer or monomers in an aqueous medium in a polymerization reactor, adding particles or pieces of a magnetically susceptible material to the suspension to act as neucleii or seeding materials for forming polymer beads and carrying out polymerization of the monomer or monomers in a conventional manner. In same cases, the magnetically susceptible core or neucleus material is slightly hydrophilic and it may be desirable to treat the surface of the material with a material to make the surfaces hydrophobic (lipophilic), for example, a kerosene solution of silicone chloride, prior to addition of the magnetically susceptible particles to the polymerization suspension. The polymerization of the monomer or monomers results in formation of a coating or mantle of polymeric material about the particles of magnetically susceptible material. A coating or mantle of polymeric material may be microreticular in accordance with conventional practice, or by adding a precipitant, in accordance with U.S. Pat. No. 4,224,415, macroreticular. In a preferred technique, a microreticular structure is first formed by dispersing the magnetically susceptible materials in a suspension of monomer or monomers in water and polymerizing the monomer or monomers to produce particles or spheres having a magnetically susceptible core or nucleus and having a coating or mantle of polymer of microreticular structure. These beads are then utilized as monomers and more monovinyl aromatic monomers are added to a suspension polymerization reactor and adding a precipitant, as taught in U.S. Pat. No. 4,224,415. Upon polymerization, a macroreticular polymer structure is formed about the original microreticular beads. By this technique it is possible to produce solid ionic exchange agents having a smaller size than is conventionally used in ion exchange techniques, for example, 40 to 80 mesh as opposed to the 20 to 40 mesh, which is conventional, and, as is pointed out hereafter, obtain improved exchange processes. This technique also permits the utilization of higher than normal dosages of crosslinking monomers such as divinyl benzene during formation, thereby yielding a resin having greater physical toughness and an essentially inert core, while at the same time overcoming the many disadvantages of smaller than normal size ionic exchange beads. For example, the disadvantages pointed out in the U.S. Pat. No. 4,224,415.

The magnetic polymeric beads are thereafter separated from the suspending medium and further processed in a conventional manner, for example, by washing with water, drying and then subjecting to treatment with a material adapted to deposit thereon functional groups of ionic character. The ionic exchange beads are then washed with water until substantially free of water soluble materials.

Because of the magnetic susceptibility of the ionic exchange agents of the present invention, separation of any beads not possessing magnetic susceptibility can be readily carried out by magnetic separation, namely applying a magnetic field to a flowing stream or suspension of the beads. The magnetic field will obviously collect magnetically susceptible beads while permitting passage of nonmagnetically susceptible beads.

The magnetic susceptibility of the solid ion exchange agents of the present application also permits novel techniques in the use of the ion exchange agent. Specifically, the smaller than normal beads can be utilized in any step of an ion exchange technique in which a liquid is flowed through a body of the ion exchange agent. Specifically, the liquid, for example, ion-containing liquids from which the ions are to be adsorbed, wash liquids, eluants or regenerating liquids, are passed through a body of the magnetically susceptible ionic exchange agent, while simultaneously applying a high gradient magnetic field to the body of ionic agent to thus maintain the body of ion exchange agent. This permits one to use much smaller ion exchange particles than those normally utilized in ion exchange techniques with the advantages that the kinetics of ion exchange would be greatly improved. The extra toughness of the ion exchange agents of the present invention will reduce the speed of transport of ions into and out of the beads, however, the greater surface area of the smaller beads more than compensate, so that the resin is more attrition resistant while retaining rapid ion exchange properties and obviously providing greater surface area for ion exchange. As pointed out in the introductory portion hereof, solid ion exchange agents, as opposed to liquid ion exchange agents can tolerate the presence of solids in the ion containing liquid from which the ions are to be removed. For example, liquids containing the small particle form solids are encountered in most mineral separation techniques, particularly the recovery of uranium. For example, a ground mineral-containing ore normally contains a coarse fraction and a fines or slime fraction. Where the total ore is treated with a leaching agent or lixiviant to remove the minerals, the leach solution will normally carry with it the fines fraction which is difficult to separate. In other cases, it is desirable to first separate the ground ore into a coarse and a fines fraction and to separately leach the fines fraction. In either case, a pregnant leach solution is produced carrying barren fines or slime from which the extracted uranium must be recovered. Accordingly, where a solid ion exchange agent is utilized to remove the extracted minerals from the pregnant leach solution it is necessary to wash the barren fines or slime from admixture with the solid ion exchange agent before recovery of the exchanged mineral ions from the solid ion exchange agent. This is normally accomplished by water washing. However, conventional techniques for maintaining a solid ion exchange agent separate from a pregnant leach solution containing fines or slimes or for washing barren fines or slimes from a mixture with the solid ion exchange agent are quite complex, time consuming and inefficient and, in most cases, result in substantial losses of ion exchange agent due to attrition and washing out of smaller particles. These disadvantages are overcome by the present technique of ion exchange, since the barren fines or slime can be readily washed from a body of the solid ion exchange material by applying a magnetic field to the body of ion exchange agent during the washing process, thus holding the body of ion exchange agent in place and preventing washing away of the ion exchange agent. In addition, attrition of the ion exchange agnet is reduced, as compared with a conventional technique which involves reciprocating a basket of the ion exchange agent in a body of stationary or flowing pregnant leach solution containing fines or slime.

As was further pointed out in the introductory portion hereof, when mineral values are extracted from subsurface earth formations by insitu extraction or from ores by contact with a leach solution or a lixiviant, the leach solution will extract a maximum amount of minerals, depending upon the mineral content of the ore, the concentration of chemcical used in the leach solution or lixiviant and the amount of minerals extracted by the leach solution. This has been found to be true, irrespective of the conditions of extraction or the number of times the extraction is repeated. This has been demonstrated by applicants where a uranium-containing ore was leached repeatedly with a given concentration of leach solution. It was discovered that, irrespective of the number of times leaching was repeated, there was a linear correlation between the uranium content of the leach solution (uranium extracted) and the uranium content of the tailings (extracted or barren ore). This linear relationship correspondens to a line indicating approximately 72% extraction of uranium. This proportionality appears to suggest that a chemical equibrilium relationship among the uranium in the ore, chemical concentration in leach solution and the extracted uranium exists, thus, there is apparently a reversible reaction and a given concentration of leach solution can remove only a given percentage of uranium. However, it has been discovered in accordance with the present invention, that if the ore is extracted with a conventional leach solution or lixiviant simultaneously with the ionic exchange of the leached mineral from the pregnant leach solution, by means of a liquid or solid ion exchange agent, substantial improvement in the extraction of minerals can be attained. Specifically, greater quantities of minerals can be extracted with a given concentration of chemicals in the leach solution or lixiviant solution, equivalent amounts of minerals can be removed with lower concentrations of chemicals in the leach solution or lixiviant solution and numerous other economies and simplifications of mineral extraction can be obtained. Obviously, at least one step in the recovery of minerals from a subsurface earth formation and particularly the ground ores is eliminated and it has also been found that the solids concentration of an ore in the extraction solution can be substantially reduced. For example, it has been found that the solids concentration can be less than about 60% by weight and preferably much less. As a result of the last advantage, the ion exchange agent, particularly a liquid agent can be easily disengaged from the aqueous phase (lixivant solution) and the water-wet ore or a solid ionic exchange agent can be easily disengaged from a slurry of ore fines or slime.

Simultaneous contact of a subsurface earth formation for the in-situ recovery of mineral values involves the conventional practice of injecting leach or lixiviant solution through an injection well, flowing the solution through the mineral-containing formation and producing pregnant leach or lixiviant solution from a production well, except that, in the present case, a conventional aqueous leach or lixiviant solution is simultaneously flowed through the subsurface formation with a liquid ion exchange agent with which the aforementioned aqueous solution is immiscible. Obviously, the leach solution and ion exchange agent may be stirred up together at the surface of the earth prior to introduction into the injection well. Alternatively the two liquids may be whipped together into an emulsion of varying stability, with emulsion break times varying from about 1 second to about 3 weeks. The two materials may be separately injected down the injection well to the vicinity of the subsurface formation and mixing to form a single two-phase stream can be accomplished at the bottom of the well adjacent the formation or within the formation itself. It is also possible to inject small alternate slugs of leach solution and ion exchange agent and accomplish substantially the same result, the slug sizes, etc. being selected on the basis of the flow characteristics of the leach solution and the ion exchange agent, respectively, through the formation and the permeability and other physical characteristics of the formation itself. The mixture of deionized leach solution and ion exchange agent containing the exchanged mineral values produced from the production well may be separated in any conventional manner, such as by gravity separation, since the organic ion exchange agent will separate readily from the aqueous leach solution. Alternatively, the two phases may be reversed in roles. For example, the leachant solution might comprise a kerosene-based solution of hexadecylnapthalene sulfonic acid, which might leach a mineral value from the subsurface formation as the metal salt of the aforementioned acid, and the ion exchange agent might be an aqueous solution of an anionic polyelectrolyte like polystyrene sulfonic acid.

Liquid ion exchange agents may also be simultaneously contacted with mineral-containing ores and leach solutions by any known batch, semi-continuous, continuous, concurrent or countercurrent contacting techniques or combinations thereof. Solid ion exchange agents may likewise be simultaneously contacted with mineral-containing ores and leach solutions by batch, semi-continuous, continuous, concurrent or countercurrent contacting or conbinations thereof. Such contacting can include deposition of the ion exchange agent in baskets and reciprocation of the basket in a suspension of the ore in a leach solution, although this complex procedure is not necessary and has certain disadvantages as compared with the present invention, particularly where the solid ion exchange agent is a magnetic ion exchange agent. Thus, a preferred embodiment comprises simultaneously contacting mineral-containing ore, a leach solution and the solid magnetically susceptible ion exchange agents of the present application. Such an operation is preferably carried out in a modified form of the semi-continuous Higgins contactor. Specifically, the mineral-containing ore, the leach solution and the magnetic ion exchange agent are simultaneously contacted in a contacting or extraction section. If a total ore, including coarse and fines ore is treated, the coarse ore can be separated by gravity separation and the mixture of the ionized leach solution, ion exchange agent and remaining fines or slime may pass for further treatment and recovery of the mineral values or if the fines fraction is preliminarily separated from the coarse fraction, the mixture of the ionized leach solution, ion exchange agent and fines or slime is passed directly to such further processing and recovery. The further processing and recovery involve passing the mixture to a washing section wherein water is passed through the mixture while simultaneously applying a magnetic field to a body of the mixture. Accordingly, the ion exchange agent will be held in place and the body of ion exchange agent maintained essentially static, while the wash water passes through the same and washes out the barren fines or slime. Thereafter, the ion exchange agent containing the exchanged mineral ions, is passed to a stripping section where a conventional solution is passed therethrough to provide a pregnant strip solution, which is removed from the system and ion exchange agent suitable for reuse, which is passed back to the contacting or extraction section. Washing barren fines from the ion exchange agent may also be carried out after stripping mineral ions from the ion exchange agent. However, it is preferred that the fines be removed before stripping in order to effect economies in use of stripping solution and facilitate stripping. In some cases it is desirable or necessary to regenerate the stripped ion exchange agent prior to use to remove poisons, etc. or to precondition the ion exchange agent, as by treatment with sulfuric acid. In such cases, this contacting section would be disposed between the stripping section and the contacting or extraction section. When utilizing the novel magnetic ionic exchange of the present application, a magnetic field may be applied to the body of ion exchange agent and other materials in any of the sequential steps of the process just described, in which case, contacting and/or separation is greatly facilitated, since washing of ion exchange agent out of the particular section is reduced, thereby improving contacting and preventing losses of ion exchange agent.

Where mined ores are to be treated in accordance with any of the previously described embodiments, a preferred technique, in accordance with the present invention, is to preliminarily separate the coarse and fines fraction as by wet classification. Where such separation is carried out, the coarse fraction which is more easily leached and which contains minor amounts of the original minerals, can be separately leached in a conventional manner or in accordance with the present invention, under much milder conditions, etc. whereas the fines fraction would be separately leached and treated with ion exchange agent in accordance with the embodiments of the present invention.

The present invention will be better understood by the following description when read in conjunction with the drawings and with specific reference to the recovery of uranium from mineral-containing ores. It is to be understood, however, that the novel ion exchange agent of the present invention is useful in any ion exchange operation, the specific techniques described, as well as others obvious to those skilled in the art, is applicable to the extraction of minerals in general from mineral-containing ores and that the specific descriptions and techniques are for illustrative purposes only and variations, modifications and equivalents will be apparent to one skilled in the art without departing from the present invention.

Figure 1:
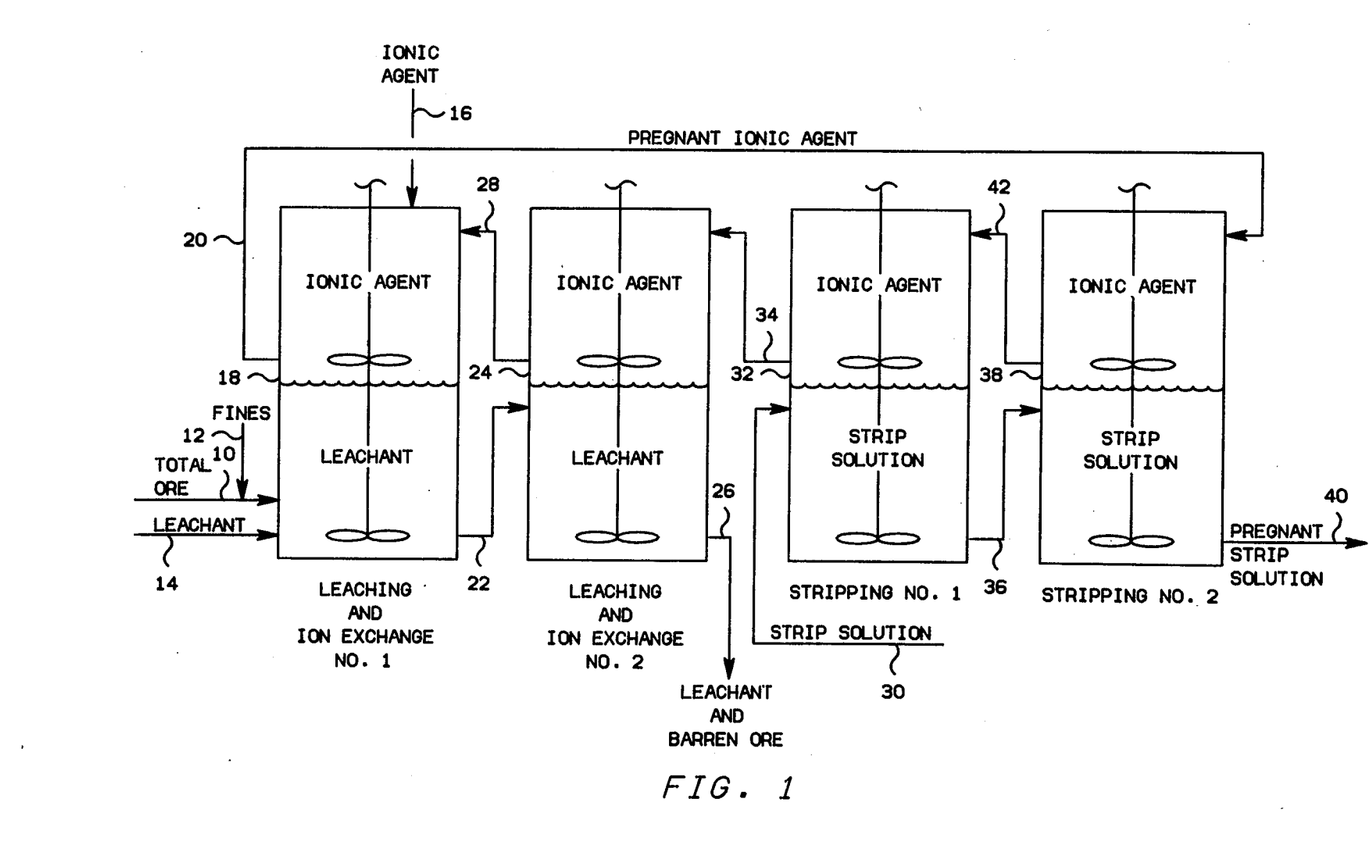
FIG. 1 is a schematic flow diagram of a mineral recovery system in accordance with one embodiment of the present invention.

FIG. 1 of the drawings shows a two-stage, batch-type system for extracting minerals values, particularly uranium, from a mineral-containing ore. In accordance with FIG. 1, total ore, i.e., coarse and fines, is introduced to the system through line 10. Alternatively and preferably, a total ore is separated into a coarse fraction and a fines fraction, for example, by wet classification and the fines slurry is admitted through line 12. Where wet classification is utilized, the fines fraction comprises the ore which remains suspended in water while the coarse fraction settles out within about 1 sec to about 1 minute. Since the coarse fraction contains a minor amount of the uranium originally in the ore and is substantially easier to extract, the uranium may be extracted by conventional means or by the same process as shown in FIG. 1, and in both cases under essentially milder conditions than the treatment of the fines fraction. A conventional leachant, either acid-type or alkaline-type is introduced through line 14 and a liquid ion exchange agent is introduced through line 16. Since a batch-type contacting is carried out, the manner and location of the introduction of the ore, the leachant and the ionic agent is immaterial, so long as all three are simultaneously contacted. In leaching and ion exchange unit 18, the leach solution removes or extracts uranium from the ore and the ionic agent recovers the extracted uranium from the pregnant leach solution by ion exchange. Following mixing and contact, mixing is discontinued and settling by gravity is permitted, as shown in the drawing. Since the ion exchange agent is organic and the leach solution carrying the partially leached ore is aqueous, phase separation occurs with the ion exchange agent containing exchanged uranium rising to the top of the container and the leach solution carrying the partially leached ore settling to the bottom. Thereafter, the pregnant ionic agent is removed through line 20 for further treatment while the leach solution carrying the partially leached uranium is discharged through line 22. The leach solution and partially extracted ore is then passed to leaching and ion exchange unit 24, where it is again simultaneously contacted with ion exchange agent from a source hereinafter described. In this unit, the remainder of the uranium is extracted from the ore by the leach solution and the ion exchange agent, in turn, removes the uranium from the pregnant leach solution. Again, agitation and contacting is discontinued, and settling or separation is permitted. The ion exchange agent collects in the top of the contacting unit, whereas the deionized leach solution and barren ore settle to the bottom. The slurry of leach solution and barren ore are discharged through line 26. The deionized leach solution and ore are separated conventionally as by filtering, etc. and the barren ore may be disposed of and the leach solution may be disposed of, reconstituted with additional fresh chemicals and recycled, or at least partially recycled for reuse. Ion exchange agent separated in unit 24 is discharged through line 28 and recycled to leaching and ion exchange unit 18. Pregnant ionic agent containing exchanged uranium and passing through line 20 is passed in countercurrent fashion through stripping unit 2, stripping unit 1, leaching and ion exchange unit 2 and leaching and ion exchange unit 1. Fresh stripping solution is introduced through line 30 to stripping unit 32 where it is contacted with ion exchange agent which has been partially stripped of exchanged uranium and in which it is essentially completely stripped for reuse. The stripped ion exchange agent is passed through line 34 to leaching and ion exchange unit 24, thence through line 28 to leaching and ion exchange unit 18. By flowing ion exchange agent in the reverse direction or countercurrently through the respective leaching and ion exchange units, the freshest ion exchange agent thus contacts pregnant leach solution which contains the smallest amount of leached uranium and is the most difficult to remove and thence through the unit 18 where the leachant contains the largest amount of extracted uranuim and is the most readily ion exchanged. In stripping unit 32, the ion exchange agent and aqueous stripping solution containing removed or stripped uranium are separated by gravity separation and the stripping solution containing part of the uranium is discharged through line 36 to stripping unit 38. In stripping unit 38, the stripping solution is in contact with the pregnant ion exchange agent from leaching and ion exchange unit 18. Thus unit 38 performs the second stage of ion exchange agent stripping. Again, the sequence of the passage of the stripping solution through stripping units 32 and 38 is such that the freshest stripping solution is in contact with the ionic agent containing the least amount of uranium and the most difficult to exchange or strip and the stripping solution thereafter contacts the ionic agent at a time when it contains the most uranium and is the least difficult to strip. The mixture in stripping unit 38 is then settled to separate the aqueous strip solution from stripped ion exchange agent. Pregnant strip solution is discharged through line 40 for conventional recovery of the uranium from the strip solution and the strip solution can thereafter be recycled for reuse. Stripped ionic agent is discharged through line 42 to stripping unit 32. To the extent necessary or desirable, an ionic agent regenerating operation can be mounted in line 42 or in line 34 to thus completely recondition the ion exchange agent for reuse.

It is apparent that the phases can be reversed: the leachant phase can be organic instead of aqueous, as described above, and the ionic agent phase can be aqueous. It may be necessary in such a reversal to adjust the density of the organic phase so that it exceeds the density of water or to alter the flows in FIG. 1 in an obvious way so that gravity separation in which the leachant solution ends up on top may be effected.

It is also quite apparent that this same batch-type operation can be employed when utilizing a solid ion exchange agent, since the same type of gravity separation can be utilized to separate organic ion exchange agent from aqueous fluids. The only requirement is that the ore, the leach solution and the ion exchange agent be simultaneously contacted in units 18 and 24 in order to obtain the benefits of the present invention.

Figure 2:
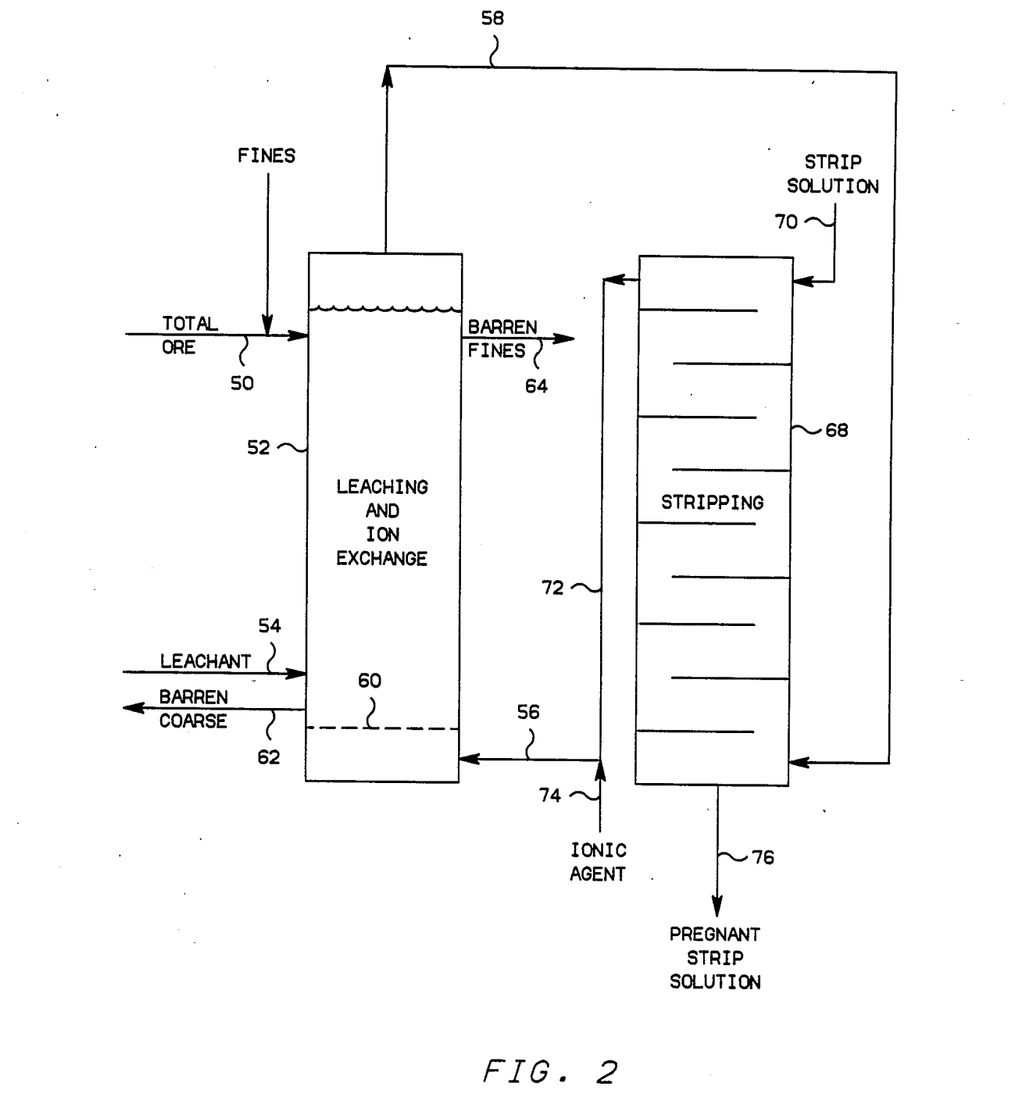
FIG. 2 is a schematic flow diagram of a mineral recovery system which is a modification of the system of FIG. 1.

FIG. 2 illustrates a continuous countercurrent system for extracting uranium from ground ores utilizing a liquid ion exchange agent. In accordance with FIG. 2, total ore comprising both coarse and fines is introduced through line 50 to leaching and ion exchange unit 52. Leach solution is introduced to unit 52 through line 54 and ion exchange agent is introduced to unit 52 through line 56. Accordingly, leach solution and ion exchange agent flow countercurrently to the ore and are in simultaneous contact. Even though continuous countercurrent flow in unit 52 occurs, phase separation between the organic ion exchange agent and the aqueous leach solution will occur. Thus ion exchange agent containing exchanged uranium can be removed from the top of the unit 52 through line 58. Coarse ore will settle from the aqueous leach solution to the bottom of unit 52. This barren coarse ore is removed by providing screen 60 adjacent the bottom of unit 52 so that a part of the dionized leach solution containing coarse barren ore can be withdrawn through line 62. This mixture is then conventionally separated to recover the leach solution which can be recycled. The fines fraction of the ore is suspended in the aqueous leach solution and therefore can be removed through line 64 along with a portion of the deionized leach solution for subsequent separation and reuse of the leach solution. If the ore is preliminarily separated into a coarse and a fines fraction, the fines fraction would be introduced through line 66. In this case, screen 60 and discharge line 62 would be eliminated. Ion exchange agent containing exchanged uranium passing through line 58 is introduced to the bottom of stripping column 68. Stripping solution is introduced to column 68 through line 70 where it flows countercurrently to ion exchange agent containing exchanged uranium. Stripping column 68 is shown as a multiple stage column for purposes of more intimate contact, but in any event, a certain degree of phase separation between the aqueous stripping solution and the organic ion exchange agent occurs. Accordingly, stripped ion exchange agent is discharged from the top of column 68 through line 72 for recycle to leaching and ion exchange unit 52. Ionic agent may be continuously or intermittently bled from the system through purge line 71 and/or 59 to prevent the build-up of poisons in the system. Ionic agent regenerant may also be added through line 73. Fresh ion exchange agent may be introduced through line 74. Pregnant strip solution containing uranium removed from the ion exchange agent is discharged through line 76 for further treatment to recover the uranium. The strip solution may, of course, be thereafter reused.

The system of FIG. 2 can be appropriately modified for use with a solid ion exchange agent. As is the case with the system of FIG. 1, any appropriate number of leaching of ion exchange units may be connected in series, as can any number of stripping units.

Figure 3:
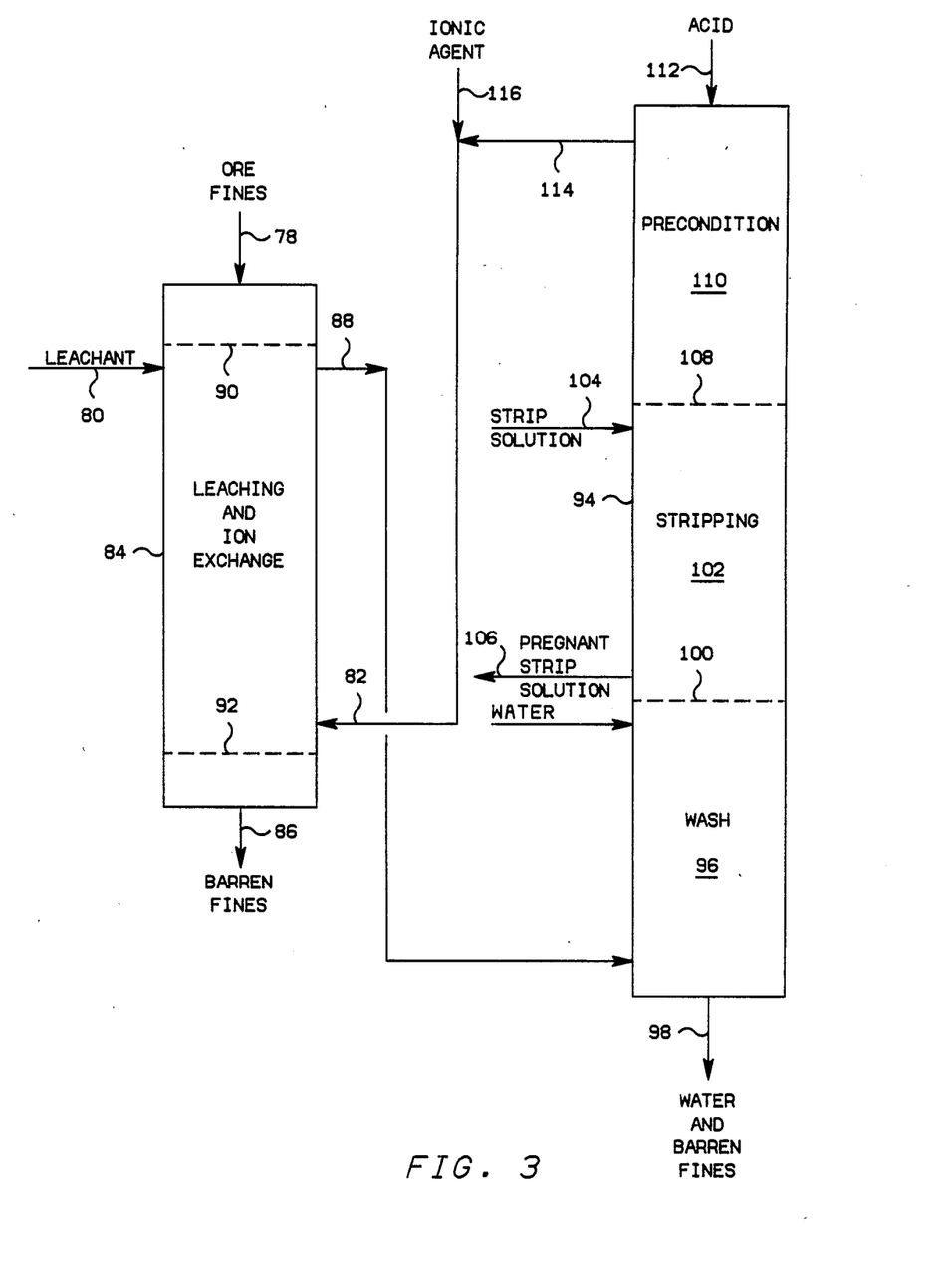
FIG. 3 is a schematic flow diagran of a mineral recovery system in accordance with another embodiment of the present invention.

FIG. 3 is the drawings illustrates a countercurrent continuous contacting system utilizing a solid ion exchange agent to remove uranium from an ore. In accordance with FIG. 3, a previously separated fines fraction of an ore is introduced through line 78. Leach solution is introduced through line 80 and ion exchange agent through line 82 to leaching and ion exchange unit 84. In this particular embodiment, it is to be noted that ion exchange agent is flowing countercurrently to both the leach solution and the ore, as opposed to ion exchange agent and leach solution flowing countercurrent to the ore as in FIG. 2. The direction of flow in FIG. 3 is believed preferably, however. The only criteria is that the leach solution, the ore and the ion exchange agent be in simultaneous contact in at least a part of the leaching and ion exchange unit 84. Leach solution and barren fines are discharged from unit 84 through line 86, whereas ion exchange agent containing exchanged uranium is removed from the top of the column through line 88. If the fines fraction of the ore is smaller than the ion exchange agent, column 84 may be provided with screens 90 and 92 to maintain the ion exchange agent within the central portion of unit 84 and permit the ore to pass through screens 90 and 92 to the bottom of the unit. Ion exchange agent containing exchanged uranium and discharged through line 88 from unit 84 is charged to the bottom of stripping column 94. Preferably, water is introduced into the lower section 96 of column 94 to wash barren fines from the ion exchange agent containing exchanged uranium. The wash solution containing the barren fines is then discharged from the bottom of the column 94 through line 98. The washed ion exchange agent then passes upwardly through a perforated disc 100 to stripping section 102 of column 94. Strip solution is introduced to section 102 through line 104, passes downwardly and countercurrently to the ion exchange agent in section 102 and strips the ion exchange agent of the uranium. Pregnant strip solution is discharged through line 106 for subsequent recovery of the uranium therefrom. Stripped ion exchange agent then passes upwardly through perforated plate 108 into preconditioning section 110 of column 94. In preconditioning section 110, the ion exchange agent is treated with acid, such as sulfuric acid, introduced through line 112 to precondition the ion exchange agent for reuse. Spent preconditioner can be discharged through line 109. The preconditioned ion exchange agent is discharged through line 114 and recycled to leaching and ion exchange unit 84. Fresh ion exchange agent may be added through line 116. Obviously, the wash section 96 and the stripping section 102 can be reversed, as previously pointed out. In addition, as previously pointed out, the stripped ion exchange agent, may, in some cases, require regeneration, in which case, a regeneration section would be provided between stripping section 102 and preconditioning section 110.

It is to be clearly recognized at this point that whereas the utilization of the novel, magnetic, solid ion exchange agent of the present invention has not been mentioned, such agent may be utilized in any of the previously described operations. In this case, in any of the units, a magnetic field would be applied to a body of the ion exchange agent to maintain said body in an essentially static condition at least momentarily. For example, in any of the units of FIG. 1, a magnetic field could be applied to hold the ion exchange agent during settling or separation of the ion exchange agent from the leach solution or the strip solution, as the leach solution or strip solution, respectively, are flowing through the body of ion exchange agent by gravity. This is particularly helpful when the ore being treated contains fines, since it will permit the leach solution to carry the fines out of the ion exchange agent. In either of the continuous operations illustrated in FIGS. 2 and 3, the magnetic ion exchange agent can be utilized and the magnetic field applied to either of the leaching and ion exchange unit or any or all of the sections of the stripping section. If continuous operation is being carried out, application of a weak magnetic field could be utilized to slow the flow of ion exchange agent and thus improve contact and passage therethrough of aqueous solutions and in particular an aqueous solution containing suspended fines. However, a better alternative would be to operate the systems semi-continuously whereby continuous flow would occur for a predetermined period of time. Flow through the unit in question would be stopped for a predetermined period, the magnetic field applied and separation of fluids and/or fines from the ion exchange agent facilitated while reducing the washing out or loss of ion exchange agent.

Alternatively, the applied magnetic field could be continuously moved upward in each section until it reaches the top of that section and is shut off; then the field could be resumed at the bottom of that section for a repeat cycle. In this fashion the magnetized particles could be continuously moved at whatever speed is desirable from one end of a section to the next. The applied field could be moved by physically moving the coil which induces the field or by providing a multiplicity of coils and a switching mechanism which could accomplish the same goal.

Figure 4:
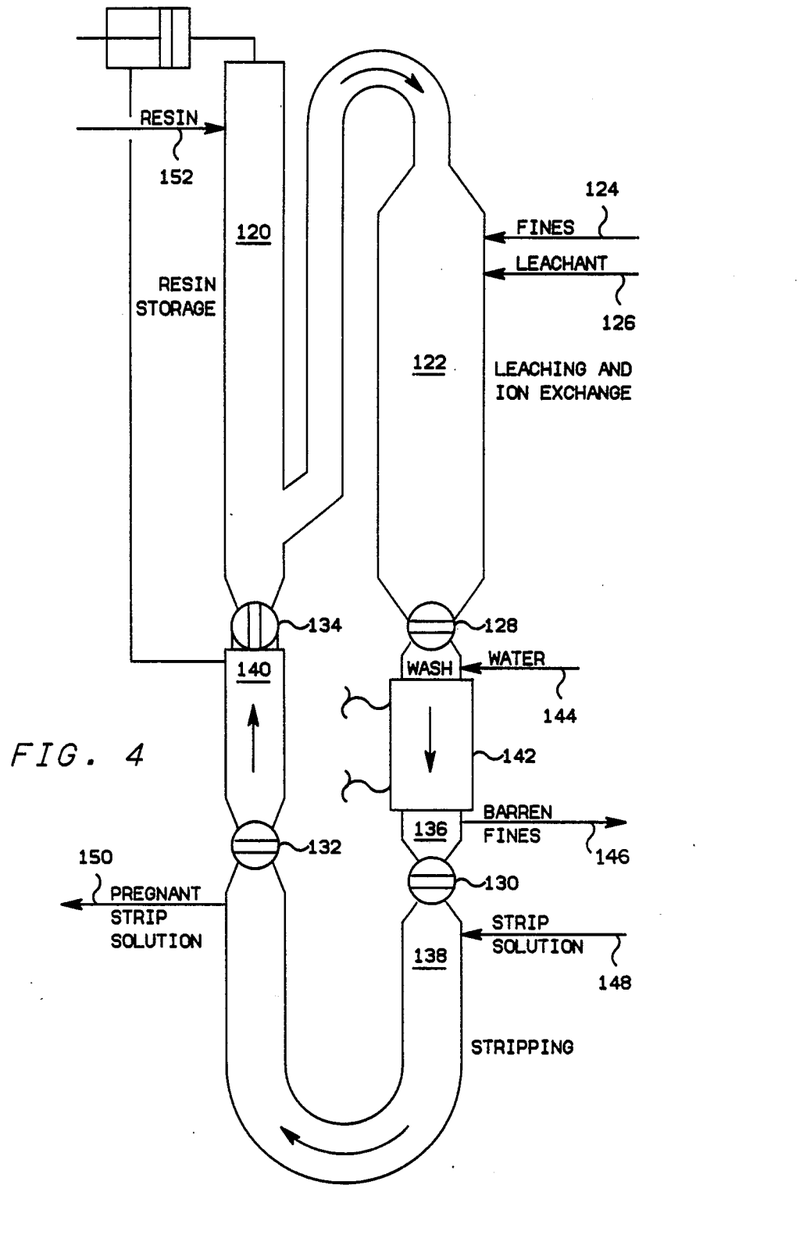
FIG. 4 is a schematic diagram of an apparatus for carrying out a mineral recovery process in accordance with yet another embodiment of the present invention.

FIG. 4 of the drawings illustrates a preferred system utilizing the novel magnetic ion exchange agent of the present invention for the removal of uranium from an ore. The system of FIG. 4 utilizes the basic semi-continuous flow of a Higgins contactor but is modified to obtain the advantages of utilizing a magnetic ion exchange agent. The system as shown in FIG. 4 is also designed for simultaneous contact of ore, leach solution and ion exchange agent in accordance with one aspect of the present invention but may be utilized to remove uranium from a slurry of pregnant leach solution and fines which has been subject to a conventional leaching operation and subsequent separation of coarse ore from the leach solution containing suspended barren fines. In accordance with FIG. 4, a supply of ion exchange agent is maintained in storage section 120 of the unit. Hydraulic pressure is applied, as in the use of a conventional Higgins contactor, to displace a portion of the ion exchange agent from storage section 120 to leaching and ion exchange section 122. The ore, preferably a fines fraction, is introduced through lines 124 to section 122 and leach solution is introduced to section 122 through line 126. In section 122, the temporarily stationary bed of ion exchange agent is simultaneously contacted with mineral-containing ore and leachant, in accordance with the present invention. The aqueous leach solution containing the suspended fines flows downwardly through the bed of ion exchange agent, thereby preventing fluidization which might occur if upflow were carried out. During the leaching and ion exchange cycle, valves 128, 130, 132 and 134 are in the positions illustrated schematically. After several minutes, liquid flow is stopped and valves 128, 130 and 132 are opened while valve 134 is closed. The liquid-filled piston pump is moved to the opposite direction whereupon solid ion exchange agent is moved hydraulically for several seconds through the system. This advances a predetermined portion of the ion exchange agent through the system. Ion exchange agent containing exchanged uranium, as well as leach solution containing barren fines is passed to wash section 136. A predetermined increment of ion exchange agent containing exchanged uranium and dionized leach solution containing suspended barren ore fines is advanced to wash section 136, an increment of washed ion exchange agent containing exchanged uranium is advanced to stripping section 138 and an increment of stripped ion exchange agent is advanced to pulse section 140. The valves are then readjusted to their original position as shown in FIG. 4 so that the bodies of materials in the various sections are again in essentially static condition and liquid flows are again started to repeat the contacting cycle. Specifically, the body of ionic exchange material containing exchanged uranium in wash unit 136 is held in palce by applying a high gradient magnetic field to the wash section by means of magnetizing unit 142. While the magnetic field is being applied, wash water is being introduced through line 144 to wash barren fines from the ion exchange agent and the water carrying the barren fines is discharged through line 146. Magnetizing unit 142 is turned off during the previously described cycle in which material is advanced through the system. The washed ion exchange agent containing exchanged uranium in stripping section 138 is also treated with stripping solution introduced through line 148 to remove the exchanged uranium from the ion exchange agent. Pregnant strip solution containing the uranium is discharged through line 150. Stripped ion exchange agent is maintained in pulse section 140. Accordingly, a semi-continuous operation is carried out which summarily includes the operating cycle in which leaching and ion exchange are carried out in section 122, washing of fines from ion exchange material is carried out in section 136, stripping of ion exchange material is carried out in section 138 and an inventory of stripped ion exchange and any make up resin necessary or desired, added through line 152, is maintained in pulse section 140 and storage section 120. Throughout this operating cycle, beds of ion exchange agent are essentially stationary and fluids are flowed through the appropriate sections of the unit, while at the same time, applying a magnetic field to the wash section 136. During the second cycle or material advance cycle, fluid flows to the various units, is cut off, the valves are reversed, as previously indicated, and hydraulic pressure is applied, as previously described, in order to move a small increment of materials cyclically through the system. The valves are then reversed to the original positions as shown in FIG. 4. Fluid flows are reinstituted and the operating cycle is repeated.

Obviously an ion exchange agent regeneration section and/or a preconditioning section could also be added, as previously discussed.

By utilizing the magnetic ion exchange agent of the present invention, it is possible to use a smaller particle size ion exchange agent, for example, 80 to 40 mesh, as opposed to the conventional, 20 to 40 mesh size, since the magnetic field prevents washing out of the smaller size ion exchange agent. The described system, utilizing the magnetic ion exchange agent, also prevents washing out of ion exchange agent by flowing liquids whether the liquids contain solids or not. The system just described also makes it convenient to combine the embodiment of the present invention in which ore, leach solution and an ion exchange material are simultaneously contacted in combination with the embodiment of the invention wherein a body of magnetic ion exchange agent is maintained essentially static to thereby maintain separation of the body from other materials, separate the ion exchange agent from other materials and permit the flow of liquids through the body of ion exchange material. It is also possible to apply a magnetic field to any of the essentially stationary bodies of ionic exchange material in the system of FIG. 4 to thereby facilitate separation of other materials from the ion exchange agent and/or pass liquid materials therethrough. In the vicinity of valves 128, 130, 132, and 134, small magnetizing units could be implaced to pull resin out from the body of the valve while the valves are being switched from one configuration to another. Such operation would eliminate one major source of resin attrition attendant in conventional Higgins column operation. It is also possible to eliminate the valves between sections by appropriate application and release of the magnetic field.

The advantages of simultaneous leaching and ion exchange is illustrated by the following example. In this series of runs, two different ores, designated as ores "A" and ores "B", were leached with sulfuric acid containing sodium chlorate as an oxidant under the conditons listed in the table which follows. The letters "F" and "C" under the ore type represent fines and coarse, respectively. As indicated in the Table, for comparative purposes, certain of the runs were carried out by contacting ore and leach solution alone, while in others, simultaneous contact between the ore, the leach solution and ionic exchange agent was carried out. In those instances in which an ion exchange agent was utilized, a solid ion exchange agent was utilized, except in Run No. 7 where a liquid agent was utilized. After contacting the composite ore, leach solution and ion exchange agent was filtered to remove the ion exchange agent (where a solid agent was utilized), or phase separated (where a liquid ion exchange agent was utilized). Thereafter, leach solution containing barren ore was filtered to remove the barren ore from the leach solution. Where a coarse or fraction was utilized, the coarse ore was first screened off and thereafter the resin removed from the leach solution. Accordingly, the columns of the Table labeled "Head", "Tail" and "Filtrate" set forth the weight percent uranium in the original ore sample, the extracted or barren ore and the clarified filtrate, respectively.

TABLE

| Ore Type | Run | Leach Condition* | Head $U_3O_8$ (wt. %) | Tail $U_3O_8$ (wt. %) | Filtrate $U_3O_8$ (wt. %) | Resin Added Type** | Wt. (gm/100 gm) | Liquid IX Agent Used** (Batchwise Contract) |
|---|---|---|---|---|---|---|---|---|
| A-F | 1 | 100/3/40/4 | .456 | .379 | .041 | None | — | None |
| A-F | 2 | 100/3/40/4 | .456 | .398 | .0012 | CSA | 25 | None |
| A-F | 3 | 100/3/40/4 | .456 | .310 | .0007 | ASB | 25 | None |
| B-C | 4 | 150/9/75/20 | .122 | .018 | .136 | None | — | None |
| B-C | 5 | 150/9/75/20 | .122 | .028 | .0034 | ASB | 25 | None |
| B-C | 6 | 100/3/75/20 | .122 | .031 | .092 | None | — | None |
| B-C | 7 | 100/3/75/20 | .122 | .032 | .015 | None | — | ASB |
| B-F | 8 | 150/9/75/20 | .216 | .119 | .046 | None | — | None |
| B-F | 9 | 150/9/75/20 | .216 | .099 | .0002 | AWB | 25 | None |

*X1/X2/X3/X4 means X1 lbs $H_2SO_4$/Ton ore; X2 lbs $NaClO_3$/Ton ore; X3 °C.; and X4 hours leach duration.
**First letter - C means cationic; A means anionic,
Second letter - S means strong; W means weak, and
Third letter - A means acid; B means base; for example, ASB would refer to an ion exchange agent which was an anionic strong base.

It is to be observed from the table, simultaneous contacting of a coarse fraction of the ore with leach solution and an ion exchange agent is of little or no benefit when judged by the amount of uranium left in the ore after the leach. Some reduction in filtrate $U_3O_8$ was observed. However, a substantial increase in the amount of uranium extracted from the ore is obtained when simultaneously contacting a fines fraction of ore with leach solution and ion exchange agent as opposed to those cases in which no ion exchange agent was present during the leaching. Obviously, if a total ore containing fines in addition to the coarse fraction were treated by simultaneous contact of the ore, leach solution and ion exchange agent, the same benefits obtained in the simultaneous treatment of the fines fraction could be expected.

While specific materials, items of equipment and modes of operation are set forth above, it is to be understood that these specific recitals are by way of example and to set forth the best mode of operation in accordance with the present invention and are not to be considered limiting and that various modifications, equivalents and variations will be apparent to one skilled in the art without departing from the present invention.

That which is claimed:

1. A continuous method for removing mineral values from a particulate, mineral-containing ore, comprising a fines ore fraction, comprising:

(a) simultaneously contacting said ore with a liquid leach solution, adapted to leach a significant amount of mineral values from said ore, and a solid ion exchange agent, having a magnetically susceptible core material and an outer coating of a polymeric material containing exchangeable ions adapted to exchange with ions of said mineral values in a leach-exchange step, for a time sufficient to leach a significant amount of said mineral values from said ore and produce an essentially barren ore and a pregnant leach solution containing the thus leached mineral values;

(b) continuing said leach-exchange step (a), for a time sufficient to exchange a significant amount of the thus leached mineral values from said pregnant leach solution for said exchangeable ions of said ion exchange agent, substantially immediately after they are leached, to produce effluent (b) comprising said barren ore, said leach solution essentially devoid of said leached mineral values and said ion exchange agent containing the thus exchanged mineral values;

(c) optionally, removing said barren ore from effluent (b) to produce effluent (c) comprising said leach solution devoid of said leached mineral values and said ion exchange agent containing exchanged mineral values;

(d) optionally, removing said leach solution devoid of said leached mineral values from effluent (b) to produce effluent (d) comprising said barren ore and said ion exchange agent containing exchanged mineral values;

(e) optionally, removing said barren ore and said leach solution devoid of said leached mineral values from effluent (b) to produce efluent (e) comprising said ion exchange exchange agent containing exchanged mineral values;

(f) contacting effluents (b), (c), (d) or (e) with a wash liquid, in a wash step, to remove barren ore from said ion exchange agent present in said effluent and produce effluent (f) comprising said ion exchange agent free of said barren ore and withdrawing said wash liquid containing said barren ore;

(g) optionally, contacting effluents (b), (c), (d), (e), or (f) with a stripping liquid, adapted to strip exchanged mineral values from said ion exchange agent containing exchanged mineral values, in a stripping step, to strip said exchanged mineral values from said ion exchange agent and produce effluent (g) comprising said ion exchange agent essentially devoid of said exchanged mineral values and withdrawing said stripping liquid containing the thus stripped mineral values;

(h) when step (g) is carried out, contacting effluent (g) with a conditioning liquid, adapted to restore said ion exchange agent to its original condition, in a reconditioning step, to produce said ion exchange agent containing exchangeable ions and withdrawing said conditioning liquid;

(i) simultaneously with at least one of contacting steps (a)–(b), (f), (g) and (h), applying an external magnetic field to said ion exchange agent present in said contacting step to maintain a static body of said ion exchange agent within said magnetic field; and (j) flowing at least one of a slurry of said ore and said leach liquid of step (a)–(b), said wash liquid, said stripping liquid and said conditioning liquid through the thus formed static body of ion exchange agent in said leach-exchange step, said wash step, said stripping step and said reconditioning step, respectively.

2. A method in accordance with claim 1 wherein the ore is a total ore, contacting step (a)–(b) is carried out without applying a magnetic field thereto, contacting step (a)–(b) is carried out under conditions permitting said coarse ore to settle and the thus settled coarse ore fraction is withdrawn before passing effluent (b) to the next successive step.

3. A method in accordance with claim 1 wherein the magnetic field and consequently the static body of ion exchange agent is moved in a direction opposite to the direction of flow of fluids flowing therethrough, whereby said ion exchange agent and said flowing fluids are countercurrently contacted.

4. A method in accordance with claim 1 wherein the contacting steps (a)–(b), (f), (g) and (h) are carried out in separate contacting zones and the magnetic field is applied individually to each of at least one of said leach-exchange step, said wash step, said stripping step and said conditioning step.

5. A method in accordance with claim 1 wherein the contacting steps are carried out in a single contacting zone, the magnetic field is applied to said single contacting zone to form said static body of ion exchange agent and a slurry of the ore and the leach liquid of step (a)–(b), the wash liquid of step (f), the stripping liquid of step (g) and the conditioning liquid of step (h) are sequentially flowed through said single zone, including the thus formed static body of ion exchange agent.

6. A method in accordance with claim 1 wherein the flow of liquid utilized in each contacting step is intervally interrupted and at least part of the effluent from the preceding contacting step is advanced to the next successive contacting step.

7. A method in accordance with claim 1 wherein steps (a)–(b), (f) and (g) are carried out sequentially and the magnetic field is applied in step (e).

8. A semicontinuous method for removing mineral values from a particulate, mineral-containing ore, comprising a fines ore fraction, comprising:

(a) simultaneously contacting a slurry of said ore and a liquid leach solution, adapted to leach a significant amount of mineral values from said ore, with a solid ion exchange agent, having a magnetically susceptible core material and an outer coating of a polymeric material containing exchangeable ions adapted to exchange with ions of said mineral values, in a leach-exchange zone, for a time sufficient to leach a significant amount of said mineral values from said ore and produce an essentially barren ore and a pregnant leach solution containing the thus leached mineral values;

(b) continuing said leach-exchange step (a), in said leach-exchange zone, for a time sufficient to exchange a significant amount of the thus leached mineral values from said pregnant leach solution for said exchangeable ions of said ion exchange agent, substantially immediately after they are leached, to produce effluent (b) comprising said barren ore, a leach solution essentially devoid of said leached mineral values and said ion exchange agent containing the thus exchanged mineral values;

(c) advancing at least part of effluent (b) to an elongated wash zone, passing a wash liquid through said ion exchange agent, in a wash step, to remove said barren ore therefrom and produce effluent (c) comprising said ion exchange agent containing exchanged mineral values and free of said barren ore and withdrawing said wash liquid containing said barren ore;

(d) advancing at least part of effluent (c) to an elongated stripping zone, passing a stripping liquid, adapted to strip exchanged mineral values from said ion exchange agent containing exchanged mineral values, through said stripping zone, in a stripping step, to strip said exchanged mineral values from said ion exchange agent containing exchanged mineral values and produce effluent (d) comprising said ion exchange agent essentially devoid of said mineral values and withdrawing said stripping liquid containing the thus stripped mineral values;

(e) advancing at least part of effluent (d) to step (a)–(b);

(f) cyclically repeating steps (a)–(b), (c), (d) and (e), whereby at least part of the effluent present in each contacting step is advanced to the next successive contacting step;

(g) simultaneously with at least one of contacting steps (c) and (d) applying a magnetic field to the ion exchange agent present in said contacting zone to maintain a static body of said ion exchange agent within said magnetic field; and (h) flowing said wash liquid and said stripping liquid through the thus formed static body of ion exchange agent in said washing zone and said stripping zone, respectively.

9. A method in accordance with claim 8 wherein the ore is a total ore, contacting step (a)–(b) is carried out under conditions permitting said coarse ore fraction to settle and the thus settled coarse ore fraction is removed before passing effluent (b) to step (c).

10. A method in accordance with claim 8 wherein the magnetic field is applied to step (c) only.

11. A batch method for removing mineral values from a particulate, mineral-containing ore, comprising a fines ore fraction, comprising:

(a) contacting a slurry of said ore and a liquid leach solution, adapted to leach a significant amount of the mineral values from said ore, with a solid ion exchange agent, having a magnetically susceptible core and an outer coating of a polymeric material containing exchangeable ions adapted to exchange with ions of said mineral values, in a batch-type, leach-exchange step, for a time sufficient to leach a significant amount of said mineral values from said ore and produce an essentially barren ore and a pregnant leach solution containing the thus leached mineral valves;

(b) continuing said leach-exchange step (a) for a time sufficient to exchange a significant amount of the thus leached mineral values from said pregnant leach solution for said exchangeable ions of said ion exchange agent, substantially immediately after they are leached, to produce effluent (b) comprising said barren ore, a leach solution essentially devoid of said leached mineral values and said ion exchange agent containing the thus exchanged mineral values;

(c) advancing at least part of effluent (b) to an elongated batch-type, washing zone, contacting said effluent (b) with a wash liquid adapted to remove ore from said ion exchange agent containing exchanged mineral values and withdrawing said wash liquid containing said barren ore and said leach solution to produce effluent (c) comprising said ion exchange agent containing exchanged mineral values;

(d) advancing effluent (c) to an elongated stripping zone, contacting said effluent (c) with a stripping liquid, adapted to strip said mineral values from said ion exchange agent containing exchanged mineral values, and withdrawing said stripping liquid containing said mineral values, as a product to produce effluent (d) comprising said ion exchange agent essentially devoid of mineral values;

(e) withdrawing effluent (e) from said stripping zone;

(g) applying an external magnetic field to at least one of steps (a)–(b), (c) and (d) to form an essentially static body of said ion exchange agent within said magnetic field and moving said magnetic field and consequently said static body of ion exchange agent from one end to the other of said leach-exchange zone, said washing zone and said stripping zone, respectively.

12. A method in accordance with claim 11 wherein the ore is a total ore, contacting step (a)–(b) is carried out without applying a magnetic field thereto, contacting step (a)–(b) is carried out under conditions permitting said coarse ore fraction to settle and the thus settled coarse ore fraction is removed before passing effluent (b) to step (c).

13. A method in accordance with claim 12 wherein the magnetic field is applied to step (c) only.

* * * * *

UNITED STATES PATENT AND TRADEMARK OFFICE
CERTIFICATE OF CORRECTION

PATENT NO. : 4,661,327

DATED : April 28, 1987

INVENTOR(S) : Robert L. Horton

It is certified that error appears in the above-identified patent and that said Letters Patent is hereby corrected as shown below:

Column 26, line 46, delete "12" and substitute ---11---.

Signed and Sealed this

Sixth Day of October, 1987

Attest:

DONALD J. QUIGG

Attesting Officer

Commissioner of Patents and Trademarks